United States Patent
Takayama et al.

(10) Patent No.: US 10,875,436 B2
(45) Date of Patent: Dec. 29, 2020

(54) VEHICLE SEAT CUSHION CORE

(71) Applicant: JSP Corporation, Tokyo (JP)

(72) Inventors: Atsuo Takayama, Kanuma (JP); Takamitsu Matsumoto, Kanuma (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 16/489,039

(22) PCT Filed: Feb. 26, 2018

(86) PCT No.: PCT/JP2018/006960
§ 371 (c)(1),
(2) Date: Aug. 27, 2019

(87) PCT Pub. No.: WO2018/159529
PCT Pub. Date: Sep. 7, 2018

(65) Prior Publication Data
US 2020/0062157 A1 Feb. 27, 2020

(30) Foreign Application Priority Data
Feb. 28, 2017 (JP) ................ 2017-035718

(51) Int. Cl.
*B60N 2/68* (2006.01)
*A47C 7/18* (2006.01)
(Continued)

(52) U.S. Cl.
CPC .............. *B60N 2/90* (2018.02); *A47C 7/18* (2013.01); *A47C 27/14* (2013.01)

(58) Field of Classification Search
CPC .............. B60N 2/90; A47C 7/18; A47C 27/14
(Continued)

(56) References Cited

U.S. PATENT DOCUMENTS 3,630,572 A * 12/1971 Homier .................. A47C 7/18
297/218.1 X
3,649,974 A * 3/1972 Baruth ................. B60N 2/5883
297/452.59 X
(Continued)

FOREIGN PATENT DOCUMENTS

DE 102014204084 A1 11/2014
EP 3395205 A1 * 10/2018 ............. B60N 2/682
(Continued)

OTHER PUBLICATIONS

Written Opinion issued in PCT/JP2018/006960; dated Apr. 17, 2018.
(Continued)

*Primary Examiner* — Rodney B White
(74) *Attorney, Agent, or Firm* — Studebaker & Brackett PC (57) ABSTRACT

Provided is a core material of a seat cushion for a vehicle, including: a thermoplastic resin expanded beads molded article having a substantially rectangular shape in top view, that has thick portions on a front side and both sides of a circumferential portion thereof, and that has an occupant seating portion on an upper surface in an inner region thereof; and an annular frame member that is insert-molded at the circumferential portion of the thermoplastic resin expanded beads molded article. In the thermoplastic resin expanded beads molded article, formed are first slits having: slit pieces that extend along a front frame member at a position in front of the occupant sitting part and inside from the front frame part; and slit pieces that extend along a side frame member at a position outside from the occupant sitting part and inside from a side frame part.

6 Claims, 6 Drawing Sheets (51) Int. Cl.
  *A47C 7/20* (2006.01)
  *B60N 2/90* (2018.01)
  *A47C 27/14* (2006.01)

(58) Field of Classification Search
  USPC ......... 297/218.1, 218.2, 218.3, 218.4, 218.5,
                297/452.26, 452.27, 452.48, 452.52,
                297/452.53
  See application file for complete search history.

(56) References Cited

U.S. PATENT DOCUMENTS

| | | | | |
|---|---|---|---|---|
| 4,609,226 A * | 9/1986 | Yoshizawa | ............... | A47C 7/18 297/452.6 |
| 4,865,383 A * | 9/1989 | Sbaragli | ............... | B60N 2/5825 297/218.2 |
| 6,299,255 B1 * | 10/2001 | Pichon | ............... | B60N 2/5825 297/218.5 |
| 6,571,411 B1 * | 6/2003 | Ebe | ............... | B60N 2/3011 297/452.27 |
| 6,592,181 B2 * | 7/2003 | Stiller | ............... | A47C 31/026 297/218.2 |
| 6,964,453 B1 * | 11/2005 | Flegal | ............... | B60N 2/5825 297/452.6 |
| 7,017,997 B2 * | 3/2006 | Takezawa | ............... | B60N 2/5825 297/452.6 |
| 7,296,852 B2 * | 11/2007 | Huse | ............... | A47C 7/021 297/218.1 |
| 7,506,939 B2 * | 3/2009 | Brockschneider | ... | B60N 2/5825 297/218.2 |
| 7,946,649 B2 * | 5/2011 | Galbreath | ............... | B60N 2/7005 297/218.1 |
| 8,191,971 B2 * | 6/2012 | Lovasz | ............... | B60N 2/5825 297/452.6 |
| 8,308,235 B2 * | 11/2012 | Ellison | ............... | B60N 2/7005 297/452.26 X |
| 8,360,530 B2 * | 1/2013 | Onoda | ............... | B60N 2/7017 297/452.27 |
| 8,540,318 B2 * | 9/2013 | Folkert | ............... | B60N 2/686 297/452.53 |
| 8,590,978 B2 * | 11/2013 | Jaranson | ............... | B60N 2/7011 297/218.1 X |
| 8,662,583 B2 * | 3/2014 | Guadagno | ............... | B60N 2/5883 297/218.2 |
| 8,991,934 B2 * | 3/2015 | Sei | ............... | B60N 2/5825 297/452.6 |
| 9,061,610 B2 * | 6/2015 | Galbreath | ............... | B60N 2/646 |
| 9,440,569 B2 * | 9/2016 | Okugawa | ............... | B60N 2/5825 |
| 9,555,728 B2 * | 1/2017 | Galbreath | ............... | B60N 3/00 |
| 10,137,808 B2 * | 11/2018 | Nagasawa | ............... | B60N 2/585 |
| 10,160,357 B2 * | 12/2018 | Galbreath | ............... | B60N 2/5825 |
| 10,414,303 B2 * | 9/2019 | Fujikake | ............... | A47C 31/02 |
| 10,414,309 B2 * | 9/2019 | Noro | ............... | B60N 2/68 |
| 10,631,650 B2 * | 4/2020 | Hashimoto | ............... | A47C 7/20 |
| 10,647,035 B2 * | 5/2020 | Sakakibara | ............... | B29C 44/1233 |
| 10,654,384 B2 * | 5/2020 | Nagasawa | ............... | B60N 2/6036 |
| 10,661,690 B2 * | 5/2020 | Goto | ............... | B60N 2/646 |
| 10,682,939 B2 * | 6/2020 | Araki | ............... | B60N 2/646 |
| 2003/0001421 A1 * | 1/2003 | Schmidt | ............... | B60N 2/5825 297/452.6 |
| 2008/0258523 A1 * | 10/2008 | Santin | ............... | B60N 2/5825 297/218.2 |
| 2009/0033131 A1 * | 2/2009 | Clauser | ............... | B60N 2/5825 297/218.4 |
| 2011/0148175 A1 * | 6/2011 | Fujita | ............... | B60N 2/7017 297/452.55 |
| 2011/0221254 A1 * | 9/2011 | Lindsay | ............... | B60N 2/686 297/452.48 X |
| 2012/0049603 A1 * | 3/2012 | Ellison | ............... | B60N 2/70 297/452.48 X |
| 2017/0057130 A1 * | 3/2017 | Sameshima | ............... | B29C 44/445 |
| 2017/0252952 A1 | 9/2017 | Takayama et al. | | |
| 2017/0327017 A1 * | 11/2017 | Nagasawa | ............... | B60N 2/6018 |
| 2018/0257526 A1 | 9/2018 | Kumagai et al. | | |
| 2018/0368578 A1 * | 12/2018 | Takayama | ............... | B60N 2/68 |
| 2019/0014907 A1 * | 1/2019 | Hisamatsu | ............... | B29C 44/445 |
| 2019/0217759 A1 * | 7/2019 | Sakakibara | ............... | B29C 39/10 |

FOREIGN PATENT DOCUMENTS

| | | | | |
|---|---|---|---|---|
| EP | 3412180 A1 * | 12/2018 | ......... | B60N 2/7017 |
| EP | 3581067 A1 * | 12/2019 | ............ | B29C 44/34 |
| EP | 3583869 A1 * | 12/2019 | ............... | A47C 7/20 |
| JP | H05-154929 A | 6/1993 | | |
| JP | 2011-045629 A | 3/2011 | | |
| JP | 2015-174340 A | 10/2015 | | |
| JP | 2016-060064 A | 4/2016 | | |
| JP | 2016-222029 A | 12/2016 | | |
| JP | 6062901 B2 * | 1/2017 | ......... | B29C 44/1271 |

OTHER PUBLICATIONS

International Search Report issued in PCT/JP2018/006960; dated Apr. 17, 2018.
The extended European search report issued by the European Patent Office dated Sep. 10, 2020, which corresponds to European Patent Application No. 18761896.2.

* cited by examiner

VEHICLE SEAT CUSHION CORE

TECHNICAL FIELD

The present invention relates to a core material of a seat cushion for a vehicle, which is made of a thermoplastic resin expanded beads molded article in which a frame member is buried.

BACKGROUND ART

In recent years, as a core material of a seat cushion for a vehicle, a core material of a seat cushion for a vehicle in which a frame member made of metal and the like is buried in and integrated into a thermoplastic resin expanded beads molded article (hereinafter sometimes simply referred to as "expanded beads molded article") is used. In this case, the frame member buried in the expanded beads molded article functions as a structural frame for attaching to a vehicle body, a structural frame for seat arrangement, a reinforcing material during collision, or the like.

A member formed by integrating such an expanded beads molded article and a frame member is composed of a base foam resin layer and the frame member disposed inside the base foam resin layer, and a composite expanded beads molded article has been proposed in which a foam layer of a foamable resin covered with the frame member and the base foam resin layer are engaged or engaged/fused to each other (see, for example, Patent Literature 1).

The production of such a composite expanded beads molded article is manufactured, for example, by so-called insert molding, in which the frame member is disposed at a predetermined position in a mold, and then the expanded beads constituting the base is filled in the mold, heated, and fused.

CITATION LIST

Patent Literature

Patent Literature 1: JP-A-H05(1993)-154929

SUMMARY OF INVENTION

Technical Problem

Incidentally, the expanded beads molded article generally undergoes molding shrinkage after in-mold molding by a mold. In the composite expanded beads molded article in which the expanded beads molded article having such a property and the frame member are integrated, warping may occur after in-mold molding due to a difference in shrinkage ratio between the expanded beads molded article and the frame member. In the case where the composite expanded beads molded article in which such warping remains is used as the core material of a seat cushion for a vehicle, there is a risk that the precision of attachment to the vehicle body is deteriorated or a predetermined performance cannot be secured.

As a measure for solving these problems, there is considered a method in which the shrinkage ratio after molding of the expanded beads molded article is predicted in advance, and the expanded beads molded article and the frame member are warped in a reverse direction to form a shape free of warpage after shrinkage.

However, since the shrinkage ratio of the expanded beads molded article after molding also differs depending on the type of thermoplastic resin expanded beads to be used, the manufacturing conditions, the material of the frame member, and the like, and is influenced by the shape of the expanded beads molded article and the arrangement state of the inserted frame member, it is difficult to accurately predict the degree of warping of the expanded beads molded article each time. Such a problem is remarkable particularly in the case of manufacturing a composite expanded beads molded article having a complicated shape in which the thick portions are formed on a foreside and both sides in order to prevent an occupant from slipping off and the like.

An object of the present invention is to provide a core material of a seat cushion for a vehicle, which is made of a thermoplastic resin expanded beads molded article into which a frame member is integrated by insert molding, which has less warping and excellent dimensional precision.

Solution to Problem

In order to solve the problems described above, the present invention is a core material of a seat cushion for a vehicle described in the following [1] to [4].

[1] A core material of a seat cushion for a vehicle including: a thermoplastic resin expanded beads molded article having a substantially rectangular shape in a top view; and an annular frame member buried in the circumferential portion of the thermoplastic resin expanded beads molded article by insert molding. The expanded beads molded article includes: thick portions on a front side and on both sides of the expanded beads molded article; and an occupant seating portion on an upper surface in an inner region with respect to the circumferential portion. The frame member includes: a front frame portion; a rear frame portion; and two side frame portions connecting the front frame portion and the rear frame portion to each other. In the expanded beads molded article, first slits are formed, the first slits each having a slit piece along the front frame member at a position in front of the occupant seating portion and inner side of the front frame portion and another slit piece along the side frame portion at a position between outside of the occupant seating portion and inside the side frame member; and at least one second slit intersecting the frame member is formed at a position in the thick portions where the frame member is buried.

[2] The core material of a seat cushion for a vehicle according to [1], in which the first slit is recessed in the thickness direction from a lower surface of the expanded beads molded article.

[3] The core material of a seat cushion for a vehicle according to [1] or [2], in which the second slit is recessed in the thickness direction from at least one of an upper surface and a lower surface of the expanded beads molded article.

[4] The core material of a seat cushion for a vehicle according to any one of [1] to [3], in which the second slit intersects the first slit.

Advantageous Effects of Invention

According to the core material of a seat cushion for a vehicle of the present invention, since the first slit along the frame member is formed, and the second slit intersecting the frame member is formed, warping due to the difference in the shrinkage ratio between the expanded beads molded article and the frame member is relieved by the presence of the first slit and the second slit, a core material of a seat cushion for a vehicle which has less warping and excellent dimensional precision can be provided.

DESCRIPTION OF EMBODIMENTS

Hereinafter, a core material of a seat cushion for a vehicle of the present invention will be described in detail.

The core material of a seat cushion for a vehicle according to the present invention which is a core material for a vehicle including: a thermoplastic resin expanded beads molded article having a substantially rectangular shape in a top view; and an annular frame member buried in the circumferential portion of the thermoplastic resin expanded beads molded article by insert molding. The expanded beads molded article includes: thick portions on a front side and on both sides of the expanded beads molded article; and an occupant seating portion on an upper surface in an inner region with respect to the circumferential portion. The frame member includes: a front frame portion; a rear frame portion; and two side frame portions connecting the front frame portion and the rear frame portion to each other. In the expanded beads molded article, first slits are formed, the first slits each having a slit piece along the front frame member at a position in front of the occupant seating portion and inside the front frame portion and another slit piece along the side frame portion at a position between outside of the occupant seating portion and inside of the side frame portion; and at least one second slit intersecting the frame member is formed at a position in the thick portions where the frame member is buried. Hereinafter, the "thermoplastic resin expanded beads molded article" is also simply referred to as an "expanded beads molded article".

The thermoplastic resin constituting the expanded beads molded article can be appropriately selected. For example, the present invention can be suitably applied to the case where a polystyrene resin; a polyolefin resin such as polyethylene or polypropylene; a polyester resin such as polyethylene terephthalate or polylactic acid; or a composite resin of a polystyrene resin and a polyolefin resin may be used. Among them, since a resin containing a polyolefin resin which is a crystalline resin is easy to shrink, the effect of the present invention for preventing warping can be remarkably exhibited when the polyolefin resin is used. It is more preferable to use a polyethylene resin, a polypropylene resin, or a composite resin of a polystyrene resin and a polyolefin resin, and it is further more preferable to use a polypropylene resin.

The thermoplastic resin expanded beads molded article in which the frame member is integrated by insert molding can be produced by a known method.

For example, a dispersing medium (usually water) and optionally a surfactant is added to a pressurizable closed container such as an autoclave, and the above-described thermoplastic resin particles are dispersed therein, the foaming agent is injected, and the mixture is stirred under heating to impregnate the resin particles with the foaming agent. Then, the resin particles impregnated with the foaming agent are discharged from the inside of the container which is under high temperature and high pressure together with the dispersion medium to a low-pressure region (usually at atmospheric pressure) to manufacture expanded beads foamed at a predetermined magnification. Next, a mold in which the frame member is arranged in a predetermined position in advance is filled with the expanded beads, and in-mold molding is performed by introducing steam to fuse the expanded beads, the frame member and the expanded beads are integrated, thus the expanded beads molded article in which the frame member is buried can be manufactured as an integral molded article.

The frame member used in the present invention is not particularly limited as long as the frame member is used as a frame member of the core material of a seat cushion for a vehicle. Examples thereof include: metal frame members made of iron, aluminum, copper, and the like; resin frame members made of an engineering plastic, a glass fiber reinforced resin, and the like, and these may be appropriately combined. The shape of the frame member is not particularly limited as long as the frame member functions as reinforcement during collision or attachment to the vehicle body, but is at least an annular shape that can be disposed at the circumferential portion of the thermoplastic resin expanded beads molded article. In a case of the annular frame member, one may have frame members having different rigidities connected to each other. For example, the front side where the highest strength is required may be formed of a frame member having a high rigidity, and both sides and the rear side may be formed of linear frame members thinner than the front side, or may be formed by interposing a different material in a part thereof. Further, when the frame member is an annular reinforcing member having a substantially quadrangular shape in top view, the shape of the front side half and the shape of the rear side half may be different. When the frame members whose material and shape are front-rear asymmetric are buried in the expanded beads molded article as described above, it is further difficult to predict the degree or direction of warping occurring in the core material.

Figure 2:
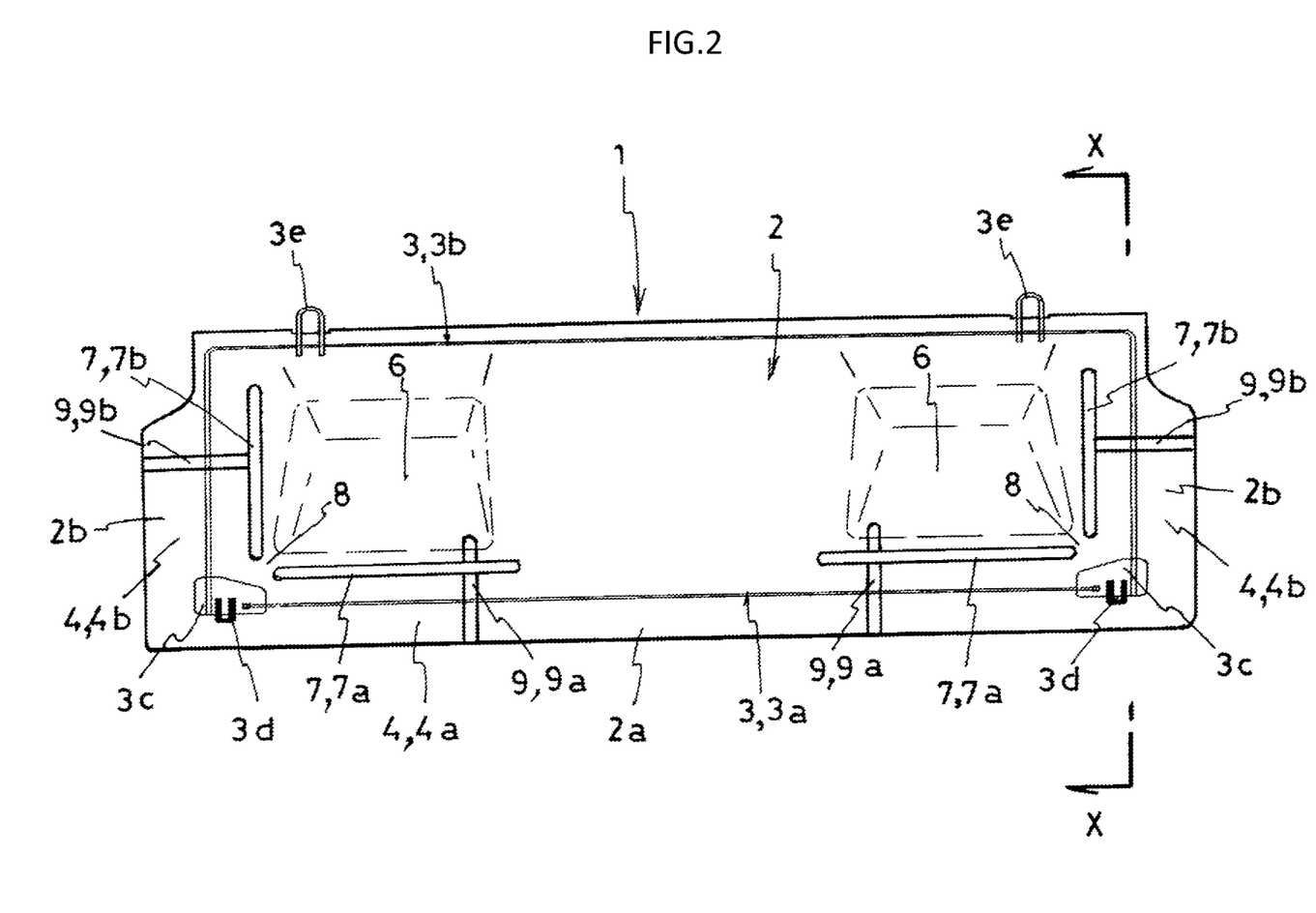
FIG. 2 is a conceptual plan view showing a state in which a frame member is buried in an expanded beads molded article of the core material of a seat cushion for a vehicle shown in FIG. 1.

When normally used as a sheet for a vehicle, as shown in FIG. 2, it is preferable to use the annular frame member 3 formed in a substantially rectangular shape which suits for the outer peripheral shape of the expanded beads molded article 2 so as to reinforce each side and four corners of the core material 1 for a seat cushion for a vehicle when viewed from above. Further, the entire periphery of the annular frame member 3 is not necessarily buried in the expanded beads molded article, and for example, a part of the frame member 3 may be exposed from the expanded beads molded article 2 in order to attach the frame member 3 to the vehicle body or to attach other members to the core material of a seat cushion for a vehicle.

In the illustrated embodiment, the frame member 3 has a substantially quadrangular annular shape, and has a front-rear asymmetric shape having different shapes between the front side half and the rear side half. The frame member 3 includes a linear front frame portion 3a having a thickness of approximately 4.5 mm, a frame portion 3b having a C shape in a plan view and a thickness of approximately 4.5 mm, and plate portions 3c connecting the front frame portion 3a and the frame portion 3b. The frame portion 3b includes a rear frame portion 3b-1 corresponding to a rear direction of the vehicle in a state in which the core material of a seat cushion for a vehicle is attached, and two side frame portions 3b-2 that connect the front frame portion and the rear frame portion to each other. A metal hook 3d for attaching to the vehicle is joined to each of the plate portions 3c, and two metal hooks 3e for connecting to the back sheet are joined to the C-shaped wire member 3b. The number of these hooks is not particularly limited.

The thermoplastic resin expanded beads molded article 2 is formed in a generally rectangular shape in a top view. The thermoplastic resin expanded beads molded article 2 includes thick portions 4a, 4b on a front side portion 2a and both side portions 2b of the circumferential portion. The size of the thermoplastic resin expanded beads molded article 2 is appropriately designed according to the vehicle to be mounted, but the length in the long side direction is generally about 1000 mm to 1400 mm, and the length in the short side direction is generally about 400 mm to 600 mm. In the illustrated embodiment, recessed portions 6, 6 are formed in which the thickness of the portions serving as two occupant seating portions is reduced in the long side direction. The thickness of the thermoplastic resin expanded beads molded article at the position of the recessed portion 6 serving as the occupant seating portion is preferably 15 mm to 40 mm, and more preferably 20 mm to 35 mm. The difference between the thickness of the thermoplastic resin expanded beads molded article at the position of the recessed portion 6 serving as the occupant seating portion and the thickness of the thermoplastic resin expanded beads molded article in the thick portion 4a of the front side portion 2a is preferably 60 mm to 165 mm, and more preferably 85 mm to 140 mm for preventing the occupant slipping off. From the same viewpoint, the thickness of the thermoplastic resin expanded beads molded article in the thick portions 4a, 4b existing in the front side portion 2a and the side portions 2b, 2b is preferably 100 mm to 180 mm, and more preferably 120 mm to 160 mm. The term "thickness" means the length of the expanded beads molded article in a vertical direction in a state in which the core material of a seat cushion for a vehicle according to the present invention is attached to the vehicle.

First slits 7 (7a, 7b) are formed along the frame member 3 at an inner side of the frame member 3 which is buried in front and outside of the recessed portions 6 serving as the occupant seating portions. In the present invention, by forming the first slits 7 (7a, 7b) along the frame member, it is possible to effectively prevent the warping due to the difference in the shrinkage amount between the expanded beads molded article 2 and the frame member 3. It is considered that this is because the formed first slits 7 (7a, 7b) can separate the occupant seating portion and the thick portions in which the frame member at the periphery thereof is buried, and can relieve the tensile force caused by the difference in the shrinkage ratio of the respective portions. Furthermore, since the frame member 3 is not exposed by the first slits 7 (7a, 7b), the integrity of the expanded beads molded article 2 and the frame member 3 is not impaired. From the viewpoint of causing such an effect, the first slits 7 (7a, 7b) are preferably formed at the inner position separated by 10 mm to 70 mm away from the frame member 3, and more preferably formed at the inner position separated by 30 mm to 50 mm.

The first slits 7 include slit pieces 7a along the front frame member at a position in front of the occupant seating portion and inner side of the front frame member (hereafter, also referred to as "long side pieces") and slit pieces 7b along the side frame member at a position outside of the occupant seating portion and inner side of the side frame member (hereafter, also referred to as "short side pieces"), and are disposed such that the long side pieces 7a and the short side pieces 7b form an L-shape. Hereinafter, the long side pieces 7a and the short side pieces 7b are collectively referred to as "substantially L-shaped slits 7". When the length of the expanded beads molded article 2 in the long side direction is 100%, the long side pieces 7a are preferably formed in a range of 20% to 40%, and more preferably in a range of 25% to 35%. When the length of the expanded beads molded article 2 in the short side direction is 100%, the short side pieces 7b are preferably formed in a range of 30% to 60%, and more preferably in a range of 35% to 55%. The widths of the slits 7 (7a, 7b) are preferably 50 mm or less, and more preferably 20 mm or less, and further more preferably 15 mm or less. The lower limit is approximately 0.1 mm. When the first slits 7 (7a, 7b) are formed during in-mold molding, the widths of the slits 7 are preferably 5 mm or more, and more preferably 10 mm or more.

Figure 5:
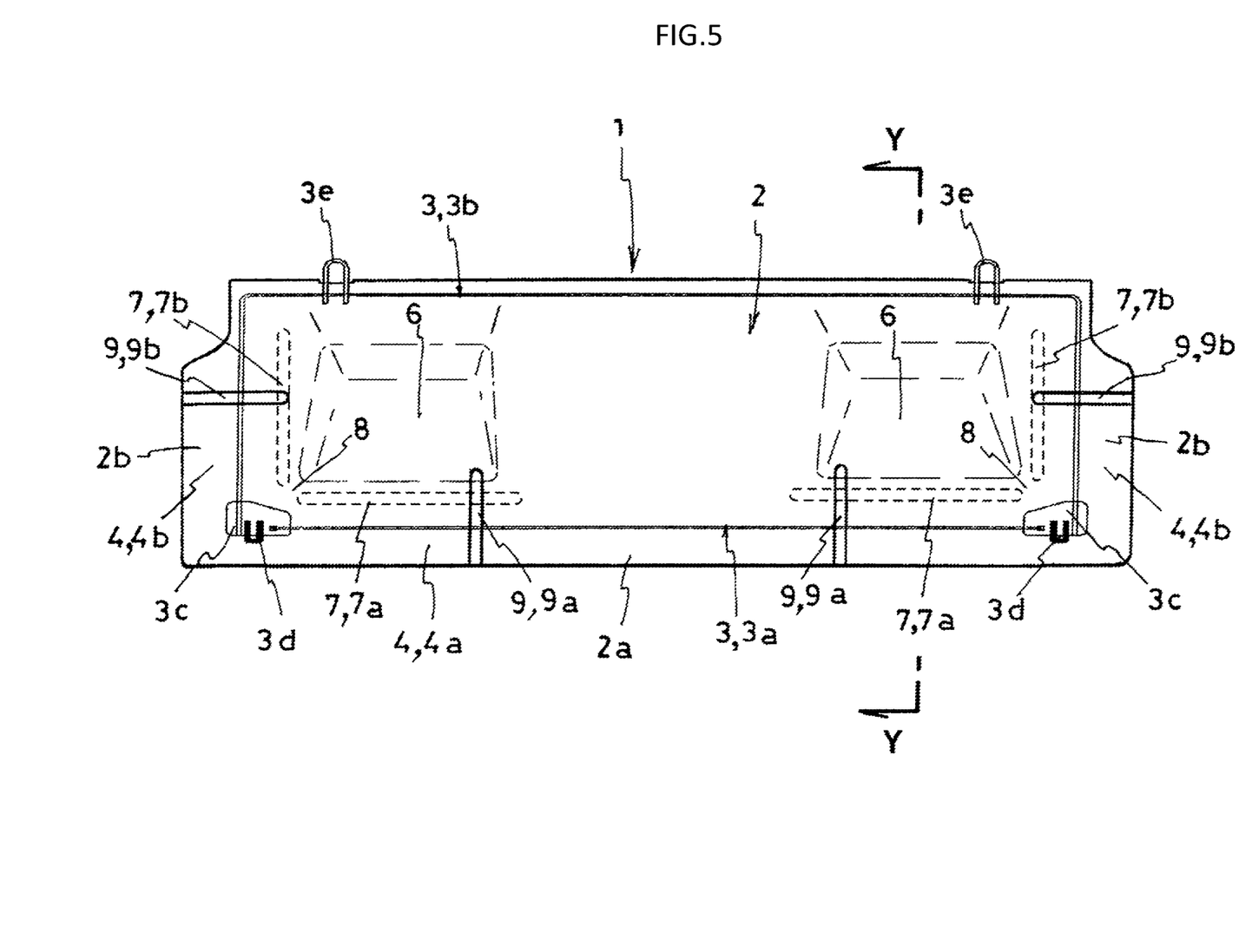
FIG. 5 is a conceptual plan view showing another embodiment of a core material of a seat cushion for a vehicle.
Figure 6:
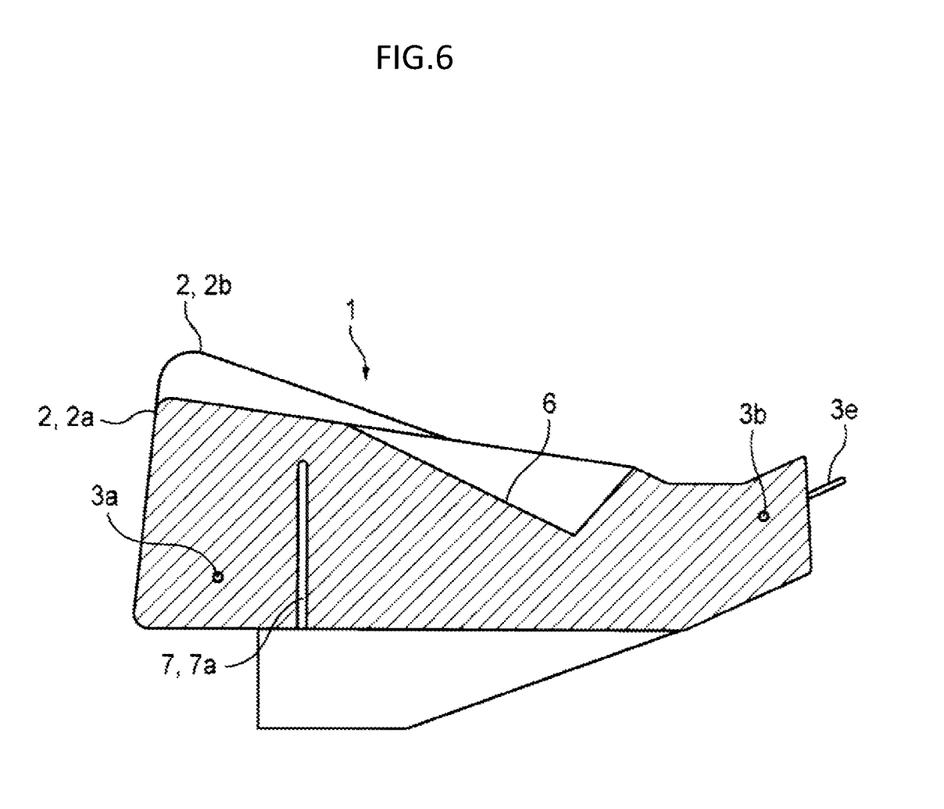
FIG. 6 is a sectional view taken along line Y-Y of FIG. 5.

Further, the thermoplastic resin expanded beads molded article 2 preferably includes connecting portions for connecting the portions of the expanded beads molded article 2 closer to the recessed portions 6 than the first slits 7 and the portions thereof closer to the frame member 3 than the first slits 7 from a viewpoint of stabilizing a separation portion between the occupant seating portion and the thick portion of the circumferential thereof between the slit pieces 7a and the slit pieces 7b of the first slits 7 formed along the frame member. In the illustrated embodiment, connecting portions 8 that divide the first slits 7 into long side pieces 7a and short side pieces 7b are provided. When the connecting portions 8 are provided between the long side pieces 7a and the short side pieces 7b, a connecting portion having a length of 10 mm to 70 mm is preferably provided, and a connecting portion having a length of 20 mm to 40 mm is more preferably provided. The length of the connecting portion means a distance between adjacent ends of the pieces 7a, 7b of the first slits 7. The first slits 7 are preferably slits passing through in the thickness direction of the expanded beads molded article 2 from the viewpoint of the above-described separation effect. However, the first slits 7 may include a bottom portion on at least a part of the upper surface side or the lower surface side of the connecting portion 8, and may have a slit connecting the pieces 7a and 7b. A soft synthetic resin foam such as urethane foam is laminated on the upper surface and/or the side surface of the core material of a seat cushion for a vehicle. From the viewpoint of preventing the urethane foam and the like from entering the upper surface of the core material of a seat cushion for a vehicle, at least a part of the first slits 7 is preferably a slit having a bottom portion on the upper surface side, and as shown in FIGS. 5 and 6, it is more preferable that the entirety of the first slits 7 is a slit that is recessed in the thickness direction from the lower surface of the expanded beads molded article 2. When the first slits 7 include a slit having a bottom portion on at least a part of the upper surface side or the lower surface side of the connecting portion 8, or as shown in FIGS. 5 and 6, when the entirety of the first slits 7 includes a bottom portion, the thickness of the expanded beads molded article 2 at the bottom portion is preferably 25 mm or less, and more preferably 15 mm or less. When the first slits 7 having the bottom portion is formed during in-mold molding, the lower limit of the thickness of the expanded beads molded article 2 at the bottom portion is preferably about 3 mm, and more preferably about 5 mm.

In the present invention, the term "front side" means the direction of the core material of a seat cushion for a vehicle that corresponds to the front direction of the vehicle in a state in which the core material of a seat cushion for a vehicle according to the present invention is attached to the vehicle, the term "side" means the direction of the core material of a seat cushion for a vehicle that is in the width direction of the vehicle, and the term "rear side" means the direction of the core material of a seat cushion for a vehicle that corresponds to the rear direction of the vehicle in a state in which the core material of a seat cushion for a vehicle according to the present invention is attached to the vehicle. The term "upper surface" means a surface on the seat surface side of the core material of a seat cushion for a vehicle, and the "lower surface" means a surface on the opposite side thereof.

In the core material 1 of a seat cushion for a vehicle according to the present invention, at least one slit 9 (second slit) intersecting the frame member is formed at a position which is in the thick portion 4 of the thermoplastic resin expanded beads molded article 2 and at a position where the frame member 3 is buried. In the present invention, in order to reduce the variation in the shrinkage amount at a specific portion of the expanded beads molded article 2 due to the fact that the frame member 3 is buried, the slit 9 is formed at a position of the thick portion 4 where the frame member 3 is buried, which is considered to have a large difference of the shrinkage, to relieve the deformation.

The slit 9 may be formed so as to pass through the expanded beads molded article 2 in the vertical direction. However, in order to suppress the occurrence of warping without impairing the integrity of the core material, it is preferable that at least one bottomed slit 9 recessed in the thickness direction is formed from at least one of the upper surface and the lower surface of the expanded beads molded article 2 in the thick portion 4. The bottomed slit 9 is preferably formed so as to extend in a direction intersecting the length direction of the frame member 3 at a position corresponding to a portion where the frame member 3 is buried of at least one of the upper surface and the lower surface of the expanded beads molded article 2.

Figure 3:
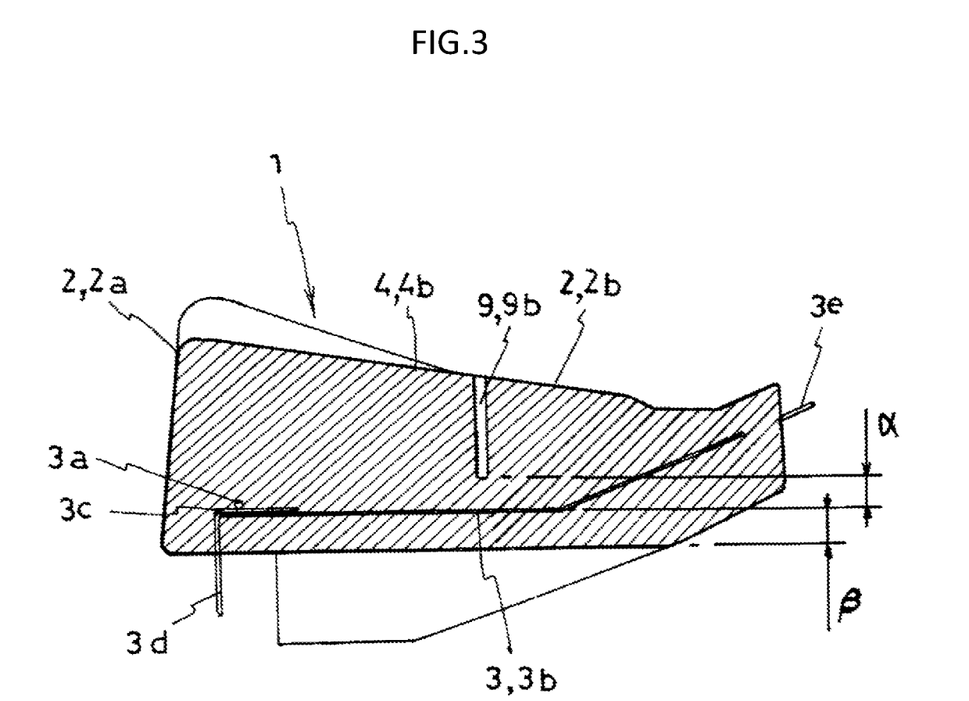
FIG. 3 is a sectional view taken along line X-X of FIG. 2.

In the core material 1 of a seat cushion for a vehicle, as shown in FIG. 3, the frame member 3 is often positioned on the lower surface side in the thickness direction of the expanded beads molded article 2. Therefore, it is preferable that the slit 9 is formed at least on the upper surface of the expanded beads molded article 2 and on the upper surface side of the frame member 3. The depth of the slit 9 formed in the expanded beads molded article 2 in the present invention is preferably such that the length ($\alpha$) in the thickness direction from the bottom portion of the slit 9 formed on the upper surface of the expanded beads molded article 2 to the frame member 3 is substantially equal to the length ($\beta$) in the thickness direction from the lower surface to the frame member 3. It is preferable that a slit has a depth such that the difference between the lengths of the ($\alpha$) and ($\beta$) is within ±60 mm, and it is more preferable that a slit has a depth such that the difference is within ±40 mm. Further, the slits 9 may be respectively formed from the upper surface and the lower surface of the expanded beads molded article 2 toward the frame member 3. When the slits 9 are respectively formed toward the frame member 3 from the upper surface and the lower surface of the expanded beads molded article 2, it is preferably such that the length in the thickness direction from the bottom portion of the slit formed on the upper surface of the expanded beads molded article 2 to the frame member 3 is substantially equal to the length in the thickness direction from the bottom portion formed on the lower surface to the frame member 3. In the case where each of the slits 9 is formed from the upper surface and the lower surface of the expanded beads molded article 2 toward the frame member 3, it is preferable that a slit having a depth such that the difference is within ±60 mm is formed, and a slit having a depth such that the difference is within ±40 mm is more preferably formed.

In the case where the slits 9 are formed from the upper surface and the lower surface of the expanded beads molded article 2 toward the frame member 3, the slits on the upper surface and the lower surface may be formed at a pair of opposed positions, but slits on the lower surface may be formed in the middle of the two slits 9 formed on the upper surface, for example.

The direction in which the slit 9 is formed is appropriately set according to the shape and size of the core material 1 of a seat cushion for a vehicle to be manufactured so as to intersect the frame member 3. Here, the intersection means a state in which the frame member 3 intersects the slit 9 in a two-dimensional plane in which the core material 1 of a seat cushion for a vehicle is observed from the upper surface. However, the intersecting angle between the frame member 3 and the slit 9 is not particularly limited, but preferably, the slit 9 is formed to intersect the frame member 3 in a substantially perpendicular direction. Preferably, the slits 9 are formed at positions equally dividing the length in the long side direction or the length in the short side direction of the core material 1 of a seat cushion for a vehicle. In the illustrated embodiment, the slits 9a, 9b are formed at two positions that divide the core material 1 in the long side direction into three substantially equal parts and at one position that divides the core material into two substantially equal parts in the short direction.

The length of the slit 9 to be formed is preferably 50 mm or more, more preferably 100 mm or more, including an intersection portion with the frame member 3. Similar to the slit 7, the width of the slit 9 to be formed is preferably 50 mm or less, more preferably 20 mm or less, and even more preferably 15 mm or less. The lower limit is approximately 0.1 mm. When the substantially slits 9 are formed by molding in-mold molding, the widths of the slits 9 are preferably 5 mm or more, and more preferably 10 mm or more.

It is preferable that the slit 9 formed to intersect the frame member 3 is formed so as to intersect the slit 7 formed along the frame member 3. As a result, the warping of the core material can be further suppressed. Similar to the above, the intersection means a state in which the slit 9 intersects the slit 7 in a two-dimensional plane in which the core material 1 of a seat cushion for a vehicle is observed from the upper surface. In the illustrated embodiment, the slits 9a formed at two positions that substantially equally divide the core material 1 into three equal parts in the long side direction are formed to intersect the pieces 7a in the long side direction of the substantially L-shaped slit 7 formed along the frame member respectively in a cross shape. Further, the slit 9b formed at one position at which the core material 1 is divided into two substantially equal parts in the short side direction is formed to communicate with the short side piece 7b of the slit 7 formed along the frame member in a T-shape.

In view of productivity, it is preferable that the slit 7 formed along the frame member 3 of the core material 1 of a seat cushion for a vehicle of the present invention and the slit 9 formed to intersect the frame member 3 in the thick portion 4 are formed at the same time as the molding of the expanded beads molded article 2 by providing protrusions for forming the slits 7, 9 in a molding mold in advance. However, the slits 7, 9 may be formed by cutting the core material 1 of a seat cushion for a vehicle molded by the molding device by using a cutter, a heat ray, and the like. In the case where the slits 7, 9 are formed after molding, it is necessary to form the slits as quickly as possible after the core material is taken out of the mold until the warping occurs in the core material.

The core material of a seat cushion for a vehicle of the present invention described above is attached to the vehicle body, a soft synthetic resin foam such as urethane foam is laminated on the upper surface and/or the side surface of the core material of a seat cushion for a vehicle. Further, the vehicular seat is formed by covering the outer peripheral surfaces of the front surface, the side surface, and the upper portion of the laminate with a skin material such as woven or knitted fabric, vinyl leather, or leather.

Note that the soft synthetic resin foam refers to a soft foamed urethane which is mainly used as the material of the seat cushion or a resin foam which is softened by increasing the foaming ratio with a resin material different from soft foamed urethane. By using the core material of a seat cushion for a vehicle of the present invention, the use amount of the soft synthetic resin foam can be reduced and a vehicle seat having excellent light weight can be formed.

EXAMPLES

Hereinafter, the core material of a seat cushion for a vehicle of the present invention will be described in more detail with reference to Examples, but the present invention is not limited to the Examples.

Six core materials of a seat cushion for a vehicle of a vehicle rear seat in which the expanded beads molded article and the frame member are integrated by using a molding device were manufactured.

As the expanded beads, polypropylene resin expanded beads (expansion ratio: 30 times, expanded beads diameter: approximately 3.5 mm) were used.

As the frame member, an annular frame member shown in FIGS. 2 and 3 was used. A metal substantially linear wire member having a thickness of 4.5 mm and a metal wire member with a thickness of 4.5 mm and a C-shape in top view and one bent portion in a side view and having a step of 30 mm in the vertical direction are connected to each other by a plate portion, a frame member was formed in a substantially quadrangular shape in top view and having a front-rear asymmetrical shape with a length of 1040 mm in the long side direction (width direction), a length of 400 mm in the short side direction (front-rear direction) and a step of 30 mm in the vertical direction.

The molding mold in which the frame member was disposed in advance was filled with the expanded beads, and in-mold molding was performed by steam heating. In the heating method, the steam of 0.30 MPa (G) was supplied from both molds for 8 seconds to perform preheating in a state in which drain valves of the both molds were opened (an exhaust process), and the steam of 0.22 MPa (G) was supplied from the mold for 15 seconds to perform heating from one mold, and the steam of 0.26 MPa (G) was supplied from the other mold for 20 seconds to perform heating from the other mold, and then the steam of 0.30 MPa (G) was supplied from both molds for 4 seconds to perform the main heating. After the completion of heating, the pressure was relieved, the molds were air-cooled down for 10 seconds, and were water-cooled for 110 seconds, so that a core material of a seat cushion for a vehicle was obtained by integrating the expanded beads molded article and the frame member.

The obtained core material of a seat cushion for a vehicle has a substantially rectangular shape in top view including thick portions on the front side and both sides of the expanded beads molded article, and so that two recessed portions serving as two occupant seating portions are formed side by side in the long side direction on the upper surface inside the circumferential portion of the expanded beads molded article.

Figure 1:
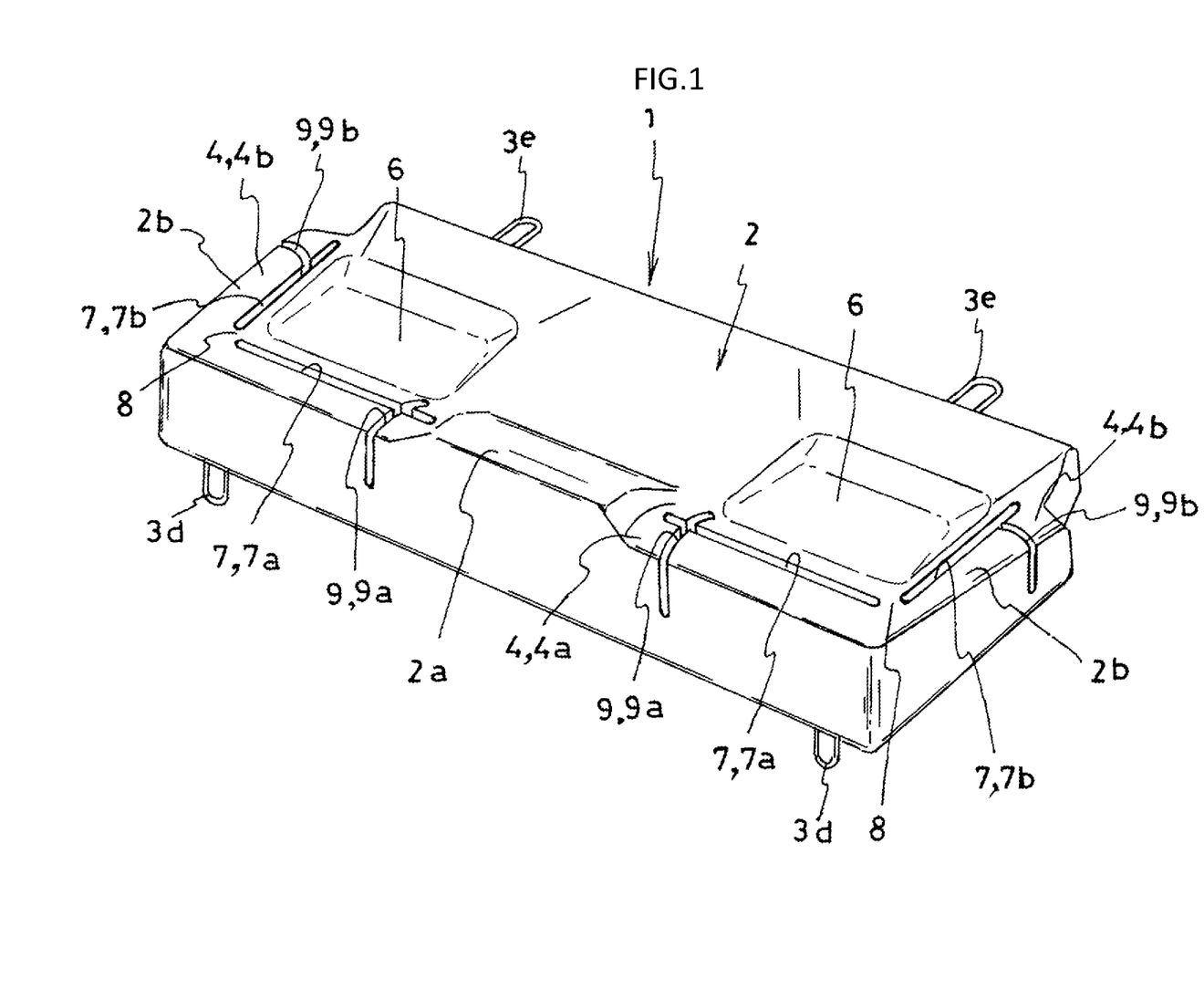
FIG. 1 is a conceptual perspective view showing an embodiment of a core material of a seat cushion for a vehicle according to the present invention.

Next, for three core materials of a seat cushion for a vehicle, by using a cutter knife, as shown in FIGS. 1 to 3, immediately after the core material was removed from the mold (within 180 seconds), substantially L-shaped slits 7 (long side pieces 7a and short side pieces 7b) along the frame member are formed at the inner position (between the frame member and the occupant seat) with respect to the frame member buried in the front and both sides of the occupant seating portion, the slits 9 intersecting the frame member are formed on a position which is in the thick portion and at a position where the frame member is buried. The substantially L-shaped slits 7 were formed to pass through the expanded beads molded article in the thickness direction at the inner position 40 mm away from the frame member. The lengths of the long side pieces 7a of the substantially L-shaped slits was formed in a range of over 29% when the length of the expanded beads molded article in the long side direction was 100%. The lengths of the short side pieces 7b of the substantially L-shaped slits was formed in a range of over 44% when the length of the expanded beads molded article in the short side direction was 100%. The widths of the substantially L-shaped slits 7 were 12 mm. Connecting portions were left between the long side pieces 7a and the short side pieces 7b of the substantially L-shaped slits 7, and the lengths of the connecting portion were 30 mm. As the slits 9 intersecting with the frame member, slits recessed in the thickness direction from the upper surface of the expanded beads molded article were formed respectively at two positions that divide the expanded beads molded article into substantially three equal parts in the long side direction, and at one position that divides the expanded beads molded article into substantially two equal parts in the short side direction. The depths of the slits 9 were formed such that the difference ($\alpha-\beta$) between the length ($\alpha$) in the thickness direction from the bottom portion of the slits to the frame member and the length ($\beta$) in the thickness direction from the lower surface of the expanded beads molded article to the frame member is −60 mm, the lengths of the slits 9 were formed by a length of 200 mm including an intersection portion with the frame member, the widths of the slits 9 were 12 mm.

Each of the three core materials of a seat cushion for a vehicle (Examples) having the slits and the remaining three core materials of a seat cushion for a vehicle (Comparative Examples) not having the slits were subjected to stand in an atmosphere of 60° C. for 12 hours for curing, and then the warping of the core materials for vehicular seat cushions in Examples and Comparative Examples were measured by the following method, and the evaluation was performed.

The core materials in Examples and Comparative Examples had a length of 1210 mm in the long side direction and a length of 500 mm in the short side direction, the thickness of the recessed portion serving as the occupant seating portion was 20 mm to 25 mm, and the thickness of the thick portion existing in front side and both sides was 130 mm to 140 mm.

(Method for Measuring Warping)

Figure 4:
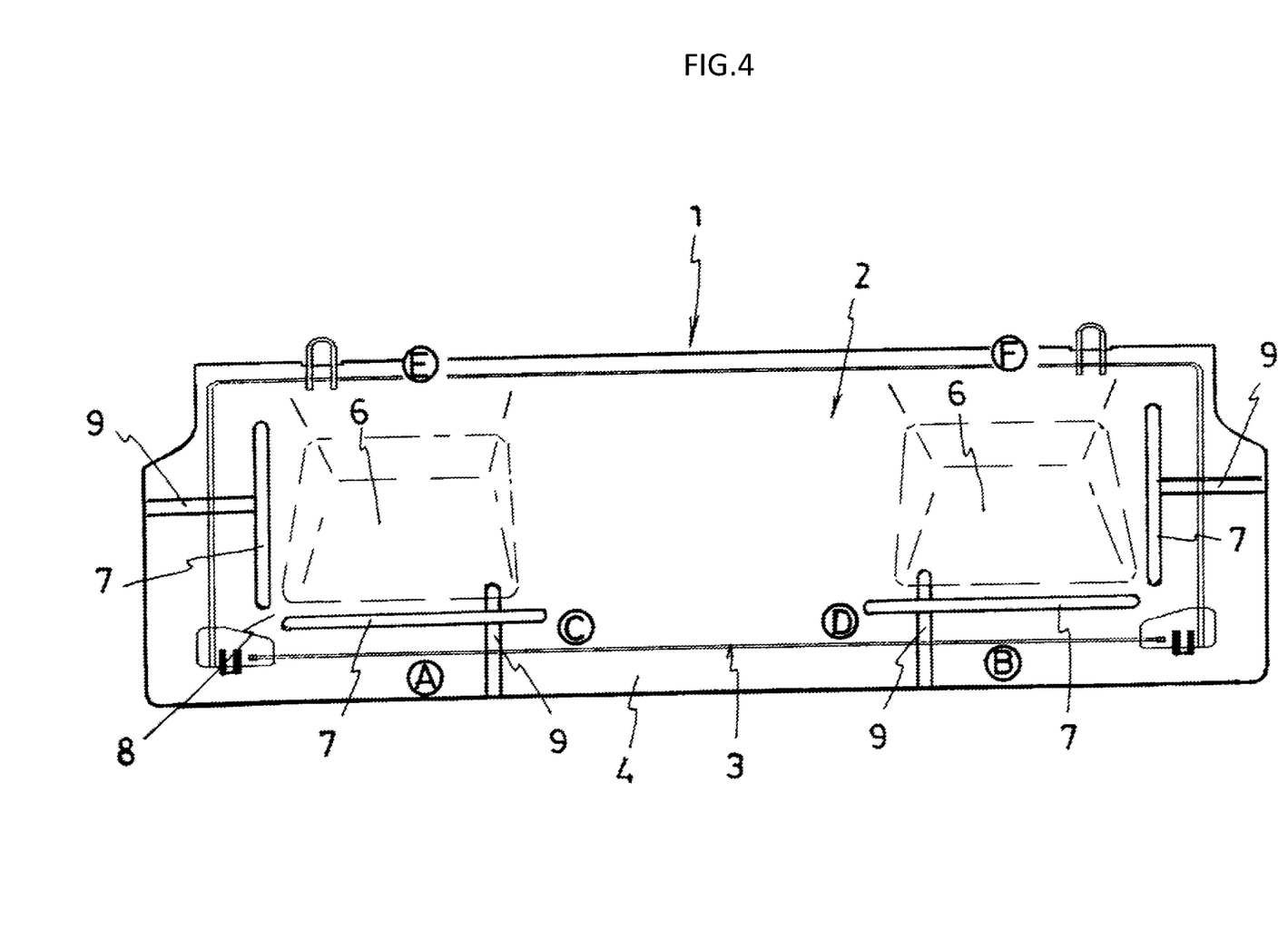
FIG. 4 is a conceptual plan view showing a measurement position of warping of an example.

The amount of displacement (mm) from the reference position was measured at the positions of A to F shown in FIG. 4 by placing the seat surface side of the core material of a seat cushion for a vehicle on an inspection jig.

It should be noted that the case where the position is higher than the reference position is denoted by "+" and the case where the position is lower than the reference position is denoted by "−".

The arithmetic mean values of the respective measurement results in three Examples and three Comparative Examples are shown in Table 1.

TABLE 1

| | Point A | Point B | Point C | Point D | Point E | Point F |
|---|---|---|---|---|---|---|
| Examples (with slit) | −1.0 | −2.0 | ±0 | −1.0 | +1.0 | +3.0 |
| Comparative Examples (without slit) | −6.0 | −5.0 | −6.0 | −5.0 | +5.0 | +6.0 |

Unit: mm

It can be seen from Table 1 that in Examples in which the slits are formed, the deformation amount of the product is smaller than the product of the Comparative Examples in which no slit exists, the warping of the expanded beads molded article is reduced, and the product value is excellent.

From the above results, it was confirmed that the core material of a seat cushion for a vehicle having a light weight, less warping, and extremely excellent commodity value can be provided by forming slits under specific conditions in the present invention.

The present application is based on Japanese Patent Application No. 2017-035718 filed on Feb. 28, 2017, the contents of which are incorporated herein by reference. In addition, all references cited herein are incorporated by reference in their entirety.

INDUSTRIAL APPLICABILITY

According to the present invention, since a core material of a seat cushion for a vehicle can be provided, which is made of a thermoplastic resin expanded beads molded article in which a frame member is integrated, has less warping and excellent dimensional precision, a soft synthetic resin foam such as urethane foam is laminated on the core material of a seat cushion for a vehicle, and the outer peripheral surface of the laminate can be widely used as a vehicle seat by further covering the outer peripheral surface with a skin material such as woven or knitted fabric, vinyl leather, or leather.

The invention claimed is:

1. A core material of a seat cushion for a vehicle comprising:
   a thermoplastic resin expanded beads molded article having a substantially rectangular shape in a top view; and
   an annular frame member buried in the circumferential portion of the thermoplastic resin expanded beads molded article by insert molding,
   the expanded beads molded article comprising:
   thick portions on a front side and on both sides of the expanded beads molded article; and an occupant seating portion on an upper surface in an inner region with respect to the circumferential portion;
   the frame member comprising:
   a front frame portion;
   a rear frame portion; and
   two side frame portions connecting the front frame portion and the rear frame portion to each other;
   wherein, in the expanded beads molded article,
   first slits are formed, the first slits formed within the expanded heads molded article, each having a first slit piece extending in a direction along the front frame portion of the frame member at a position in front of the occupant seating portion and behind the front frame portion and a second slit piece extending in a direction along the side frame portion of the frame member at a position between outside of the occupant seating portion and inside of the side frame portion; and
   at least one second slit intersecting the frame member is formed at a position in the thick portions where the frame member is buried.

2. The core material of a seat cushion for a vehicle according to claim 1, wherein the first slit is recessed in a thickness direction from a lower surface of the expanded beads molded article.

3. The core material of a seat cushion for a vehicle according to claim 1, wherein the second slit is recessed in a thickness direction from at least one of an upper surface and a lower surface of the expanded beads molded article.

4. The core material of a seat cushion for a vehicle according to claim 1, wherein the second slit intersects the first slit.

5. The core material of a seat cushion for a vehicle according to claim 1, wherein the first slit piece is formed in a region of the expanded heads molded article 0 mm to 70 mm behind the front frame portion.

6. The core material of a seat cushion for a vehicle according to claim 1, wherein the second slit piece is formed in a region of the expanded heads molded article 0 mm to 70 mm inside of the side frame portion.

* * * * *